United States Patent
Saxena et al.

(10) Patent No.: US 6,999,091 B2
(45) Date of Patent: Feb. 14, 2006

(54) DUAL MEMORY CHANNEL INTERLEAVING FOR GRAPHICS AND VIDEO

(75) Inventors: Alankar Saxena, Folsom, CA (US); Aditya Sreenivas, Eldorado Hills, CA (US); Tom A. Piazza, Granite Bay, CA (US)

(73) Assignee: Intel Corporation, Santa Clara, CA (US)

(*) Notice: Subject to any disclaimer, the term of this patent is extended or adjusted under 35 U.S.C. 154(b) by 212 days.

(21) Appl. No.: 10/033,439

(22) Filed: Dec. 28, 2001

(65) Prior Publication Data
US 2003/0122837 A1 Jul. 3, 2003

(51) Int. Cl.
G06F 12/02 (2006.01)

(52) U.S. Cl. ........................................ 345/566; 345/540

(58) Field of Classification Search ................ 345/540, 345/564, 536, 566, 568, 569, 571, 572; 711/202–208, 711/211
See application file for complete search history.

(56) References Cited

U.S. PATENT DOCUMENTS

| | | | | |
|---|---|---|---|---|
| 5,900,865 A | * | 5/1999 | Howe | 345/572 |
| 6,064,407 A | * | 5/2000 | Rogers | 345/568 |
| 6,301,299 B1 | * | 10/2001 | Sita et al. | 375/240.01 |
| 6,674,443 B1 | * | 1/2004 | Chowdhuri et al. | 345/531 |
| 6,690,377 B1 | * | 2/2004 | Tuomi | 345/568 |

* cited by examiner

Primary Examiner—Kee M. Tung
(74) Attorney, Agent, or Firm—Sharon Wong

(57) ABSTRACT

Embodiments of the present invention provide a method and apparatus for optimally mapping a tiled memory surface to two memory channels, operating in an interleaved fashion, maximizing the memory efficiency of the two channels, while maintaining the desired access granularity. In particular, an incoming request address is used to generate memory addresses for memory channels based on tile and request parameters. The memory controller stores the set of tiled data in the memory in a format such that selected sets of tiled data are stored in alternating channels of memory, such that data blocks are accessible at the same time, as opposed to sequentially. Thus if the memory controller received a block of data from a source, such as a graphics engine, the memory controller would store portions of the block of data within a single tile in the memory, partitioned such that it is retrievable via alternate channels of memory at the same time.

34 Claims, 11 Drawing Sheets

| QW 0 | QW 1 | QW 2 | QW 3 | QW 4 | QW 5 | QW 6 | QW 7 | QW 8 | QW 9 | QW 10 | QW 11 | QW 12 | QW 13 | QW 14 | QW 15 |
|---|---|---|---|---|---|---|---|---|---|---|---|---|---|---|---|
| QW 16 | QW 17 | QW 18 | QW 19 | QW 20 | QW 21 | QW 22 | QW 23 | QW 24 | QW 25 | QW 26 | QW 27 | QW 28 | QW 29 | QW 30 | QW 31 |
| QW 240 | QW 241 | QW 242 | QW 243 | QW 244 | QW 245 | QW 246 | QW 247 | QW 248 | QW 249 | QW 250 | QW 251 | QW 252 | QW 253 | QW 254 | QW 255 |

16 QWORD COLUMNS × 16 ROWS

Request Address (31:5) = Translated Tiled Address (31:5)

If (Tiled Addr [4] == '0' AND Tiled Addr [7] =='0') OR
   (Tiled Addr [4] == '1' AND Tiled Addr [7] =='1'):
      Channel 0: Request Address
      Channel 1: Request Address + 256B If (Tiled Addr [4] == '0' AND Tiled Addr [7] =='1') OR
   (Tiled Addr [4] == '1' AND Tiled Addr [7] =='0'):
      Channel 0: Request Address + 256B
      Channel 1: Request Address

Request Address (31:5) = Translated Tiled Address (31:5)

If (Tiled Addr [5] == '0' AND Tiled Addr [4] =='0') OR
   (Tiled Addr [5] == '1' AND Tiled Addr [4] =='1'):

Channel 0:   Request Address,
      Qword (Tiled Addr [3]) = Qword 0 of Source
      Qword (Tiled Addr [3]) = Not Used/Updated.
Channel 1:   Request Address +128B,
      Qword (Tiled Addr [3]) = Qword 1 of Source
      Qword (Tiled Addr [3]) = Not Used/Updated.

If (Tiled Addr [5] == '0' AND Tiled Addr [4] =='0') OR
   (Tiled Addr [5] == '1' AND Tiled Addr [4] =='1'):

Channel 0:   Request Address + 128B,
      Qword (Tiled Addr [3]) = Qword 1 of Source
      Qword (Tiled Addr [3]) = Not Used/Updated.
Channel 1:   Request Address,
      Qword (Tiled Addr [3]) = Qword 0 of Source
      Qword (Tiled Addr [3]) = Not Used/Updated.

FIG. 12

DUAL MEMORY CHANNEL INTERLEAVING FOR GRAPHICS AND VIDEO

BACKGROUND

1. Field

The invention relates generally to computer systems, and in particular, to computer systems that employ a method for dual memory channel interleaving.

2. Background Information

For bandwidth intensive operations like graphics and MPEG, two channels of memory may be required to provide sufficient data bandwidth. In a dual memory channel system, the two channels can be accessed in two different ways. The first approach is to treat them as completely independent memory ports, where any memory access goes to one channel and the two channels are accessed completely independently of each other. The second approach is to interleave the two channels, so that any memory access is sent to both the channels, and both channels operate in lock-step of each other.

When dealing with memory operands (e.g. graphic surfaces) that are inherently rectangular in nature, certain functions within the graphics device support the storage/access of the operands using tiled memory formats in order to increase performance. Rectangular memory operands have a specific width and height, and are considered as residing within an enclosing rectangular region whose width is considered the pitch of the region and surfaces contained within. Surfaces stored within an enclosing region must have widths less than or equal to the region pitch.

The simplest storage format is the linear format, where each row of the operand is stored in sequentially increasing memory locations. If the surface width is less than the enclosing region's pitch, there will be additional memory storage between rows to accommodate the region's pitch. The pitch of the enclosing region determines the distance (in the memory address space) between vertically adjacent operand elements.

The linear format is best suited for one-dimensional row-sequential access patterns (e.g., a display surface where each scan line is read sequentially). Here the fact that one object element may reside in a different memory page than its vertically adjacent neighbors is not significant. All that matters is that horizontally adjacent elements are stored contiguously. However, when a device function needs to access a 2D sub-region within an operand (e.g., a read or write of a 4×4 pixel span), having vertically adjacent elements fall within different memory pages is to be avoided, as the page crossings required to complete the access typically incur increased memory latencies (and therefore lower performance).

One solution to the problem is to divide the enclosing region into an array of smaller rectangular regions, called memory tiles. Surface elements falling within a given tile will all be stored in the same physical memory page, thus eliminating page-crossing penalties for 2D sub-region accesses within a tile and thereby increasing performance. The rearrangement of the surface elements in memory must be accounted for in functions operating upon tiled surfaces. This requires either the modification of an element's linear memory address or an alternate formula to convert an element's X, Y coordinates into a tiled memory address. However, before tiled address generation can take place, some mechanism must be used to determine whether the surface elements accessed fall in a linear or tiled region of memory, and if tiled, what the tile region pitch is, and whether the tiled region uses X-major or Y-major format.

What is need therefore is a method and apparatus for optimally mapping a tiled memory surface to two memory channels, operating in an interleaved fashion, maximizing the memory efficiency of the two channels, while maintaining the desired access granularity.

BRIEF DESCRIPTION OF THE DRAWINGS

FIG. 3 illustrates a diagram of an embodiment of a tile subdivided into a 16-high by 16-wide array of Owords arranged in a X-major format.

FIG. 11 illustrates a flow diagram of an embodiment of a process for using an incoming request address to generate memory addresses for two memory channels based on tile and request parameters for a X-Major Tile, Y Walk Data Request for 2 Owords skipping one (Even or Odd Owords in an aligned Quad Oword region, 2 Owords on alternate scan lines).

FIG. 12 illustrates a flow diagram of an embodiment of a process for using an incoming request address to generate memory addresses for two memory channels based on tile and request parameters for a Y-Major Tile, X Walk Data Request for an Aligned Oword on a Scan Line.

DETAILED DESCRIPTION

Figure 1:
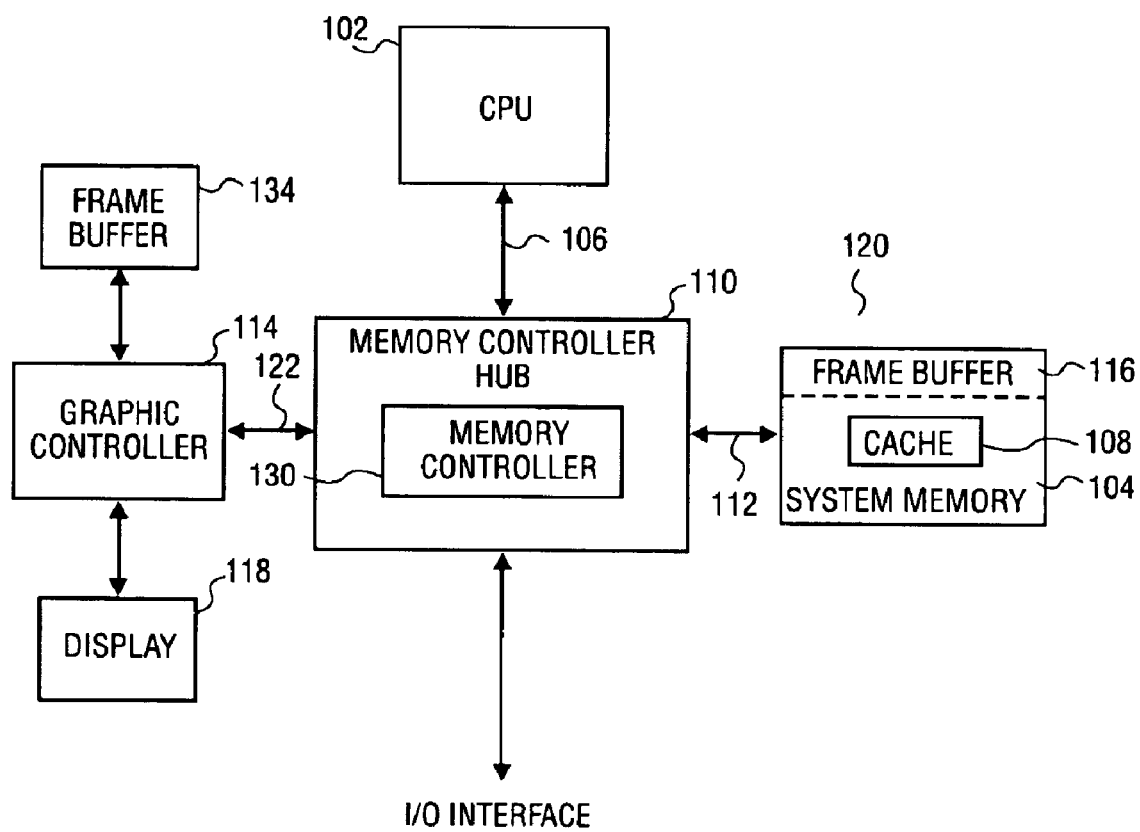
FIG. 1 illustrates a functional block diagram of an embodiment of an exemplary computer system embodying the present invention.

Embodiments of the present invention provide a method and apparatus for optimally mapping a tiled memory surface to two memory channels, operating in an interleaved fashion, maximizing the memory efficiency of the two channels, while maintaining the desired access granularity. In particular, an incoming request address is used to generate memory addresses for memory channels based on tile and request parameters. The memory controller stores the set of tiled data in the memory in a format such that selected set of tiled data are stored in alternating channels of memory, such that data blocks are accessible at the same time, as opposed to sequentially. Thus if the memory controller received a block of data from a source, such as a graphics engine, the memory controller would store portions of the block of data within a single tile in the memory, partitioned such that portions are retrievable via alternate channels of memory at the same time.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus. Instructions are executable using one or more processing devices (e.g., processors, central processing units, etc.).

The algorithms and displays presented herein are not inherently related to any particular computer or other apparatus. Various general-purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

FIG. 1 illustrates a functional block diagram of an embodiment 100 of an exemplary computer system embodying the present invention that can be utilized for processing video graphics and image data. In particular, computer system includes processor (CPU) 102 and system memory 104. System memory 104 is a memory in which the mapping algorithm of the present invention as well as application programs are stored and from which processor 102 primarily executes. Memory 104 may be a random access memory (RAM), ROM or any other type of computer readable storage medium. For example, system memory 104 can be comprised of SDRAM (Synchronous DRAM) or RDRAM (RAMBUS DRAM) or DDR (Double Data Rate synchronous DRAM). When executed by processor 102, the mapping algorithm of the present invention causes processor 102 to perform the functions illustrated and described herein such that a tiled memory surface is mapped to two memory channels, operating in an interleaved fashion, maximizing the memory efficiency of the two channels, while maintaining the desired access granularity.

Processor 102 is coupled to memory controller hub 110 by host bus 106. Memory controller hub 110 includes memory controller 130 and is in turn coupled to system memory 104 by memory bus 112. Memory controller hub 110 is also coupled to graphics controller 114. Graphics controller 114 may be integrated into memory controller hub 110. Graphics controller 114 accesses local frame buffer 116 to store and retrieve graphics data stored therein for display on display 118. Display 118 can be a CRT, liquid crystal display, or other display device. For systems that use an UMA configuration, local frame buffer 116 is replaced by partitioning a portion of system memory 104 to create frame buffer 116, resulting in shared memory 120. Frame buffer 116 can be used to store the tiled image data for use. In such an embodiment, the data may be read from memory 104 and written to frame buffer 116 based on mapping algorithm of the present invention.

Graphics controller 114 is provided to control the rendering of text and images on display 118. Graphics controller 114 may embody a typical graphics accelerator generally known in the art to render three-dimensional data structures that can be effectively shifted into and from system memory 104. Graphics controller 114 may therefore be a master of AGP bus 122 in that it can request and receive access to a target interface within memory controller hub 110 to thereby obtain access to system memory 104. A dedicated graphics bus accommodates rapid retrieval of data from system memory 104. For certain requests, graphics controller 114 may further be configured to generate PCI protocol transactions on AGP bus 122. The AGP interface of memory controller hub 110 may thus include functionality to support both AGP protocol transactions as well as PCI protocol target and initiator transactions. Memory controller hub 110 is coupled to an I/O controller hub or other I/O interface (now shown). I/O controller interface can include a PCI interface for expansion cards as well as plurality of interfaces for I/O devices.

System also includes a cache memory 108. Processor reads tiled image data from frame buffer 116 and constructs a derived image for display based on the image data stored in frame buffer 116. Some of the image data may be stored in cache 108 for future use, and because at least a portion of the image data in frame buffer 116 is tiled, usage of cache 108 will be more efficient than in systems where data is stored in linear format.

An example of a tiled memory access would include accessing a small region of a three-dimensional drawing, where the small region equates to a graphics primitive, such as a triangle or rectangle. The data mapping the three-dimensional drawing is preferably stored in memory in a tiled format that groups localized areas of the drawing together in the memory. Some graphics generation steps may include tiled memory accesses, such as those that would occur in accessing a texture that is stored in a tiled format in memory. Another example of a tiled memory access might include retrieving a portion of an MPEG image for motion compensation processing. The present invention is not limited to the source of use of tiled matter but rather maps the requested accesses in such a way as to maximize memory efficiency.

Tiles

Figure 2A:
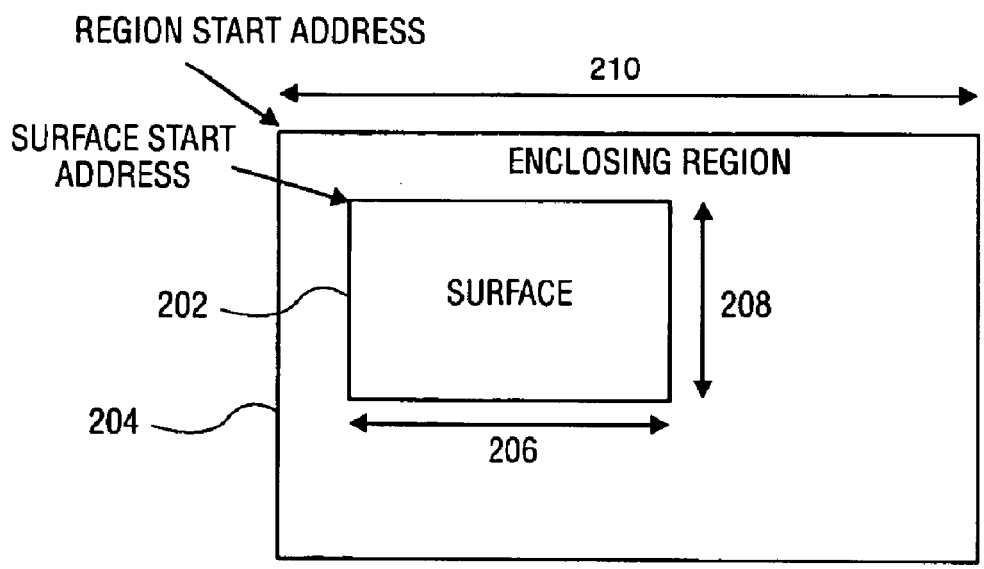
FIG. 2(a) illustrates a diagram of an embodiment of a rectangular memory operand residing within an enclosed rectangular region.

FIG. 2(a) illustrates a diagram of an embodiment 200 of a rectangular memory operand 202 residing within an enclosed rectangular region 204. Rectangular operands 202 have a specific width 206 and height 208, and are considered as residing within an enclosed rectangular region 204 whose width 210 is considered the pitch of the region 204. Surfaces 202 stored within enclosed region 204 have widths 206 less than or equal to the enclosed region pitch 210. Each enclosed region 210 may be divided into a plurality of tiles, an embodiment 212 of which is illustrated in FIG. 2(b).

Figure 2B:
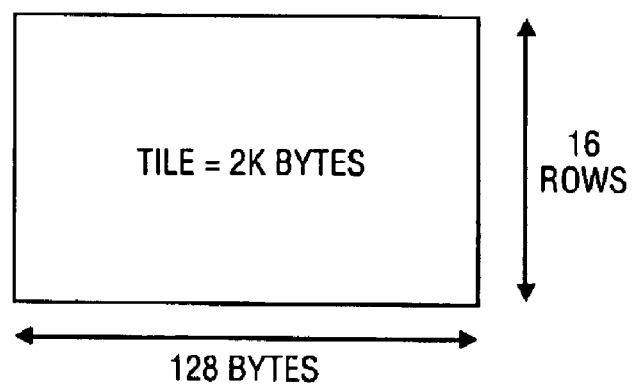
FIG. 2(b) illustrates a diagram of an embodiment of a tile.

Referring to FIG. 2(B), each tile 212 has a fixed size. For example, as shown, a 2K-byte tile 212 is represented by 16 rows in the vertical direction and 128 bytes in the horizontal direction. Enclosed region 204 (FIG. 2(a)) is represented by an array of such tiles 212.

Figure 4:
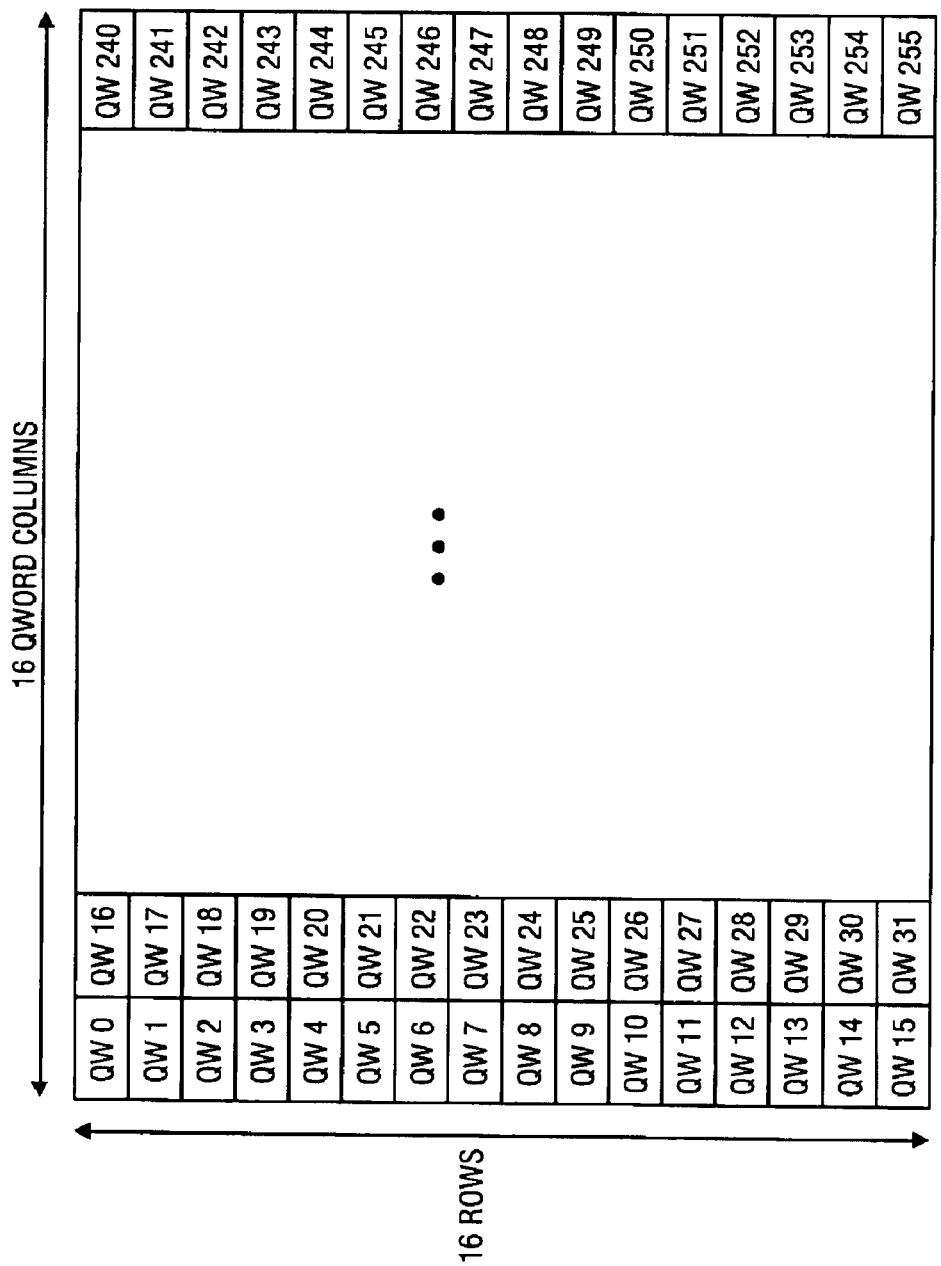
FIG. 4 illustrates a diagram of an embodiment of a tile subdivided into a 16-high by 16-wide array of Owords arranged in a Y-major format.

Referring to FIGS. 3 and 4, embodiments of an X-major format tile 300 and Y-major format tile 400 are illustrated. Tiles 300 and 400 are each further subdivided into a 16-high by 16-wide array of 256 quad words (Qwords) arranged in a X-major (row-major) format and Y-major (column major) format, respectively. Each Qword contains four words, or 8 bytes. In X-major format tile 300, horizontally adjacent elements (QW0, QW1 . . . QW15) are stored in sequential memory addresses. In Y-major tile format tile 400, vertically adjacent elements (QW0, QW1 . . . QW15) are stored in sequential memory addresses.

One skilled in the art will recognize that the selection of the tile direction only impacts the internal organization of tile data, and does not affect how surfaces map onto tiles. For example, references to dividing data into bytes, words, double words (Dwords), quad words (Qwords), etc., when used in the specification and claims, are not intended to be limiting as to the size, but rather, are intended to mean blocks of data. For example, the present invention could be implemented with double words (Dword, 4-byte quantity), oct-words (Oword, 16-byte quantity) and hex-words (Hword, 32-byte quantity) as well.

Tiling Support

The rearrangement of the surface elements in memory must be accounted for in functions operating upon tiled surfaces. This requires translation of a source memory request address into a tiled memory address. Before tile-address generation takes place, embodiments of the present invention determine whether the surface elements accessed fall in a linear or tiled region of memory, and if tiled, what the tile region pitch is, and whether the tiled region uses X-major or Y-major format.

Figure 5:
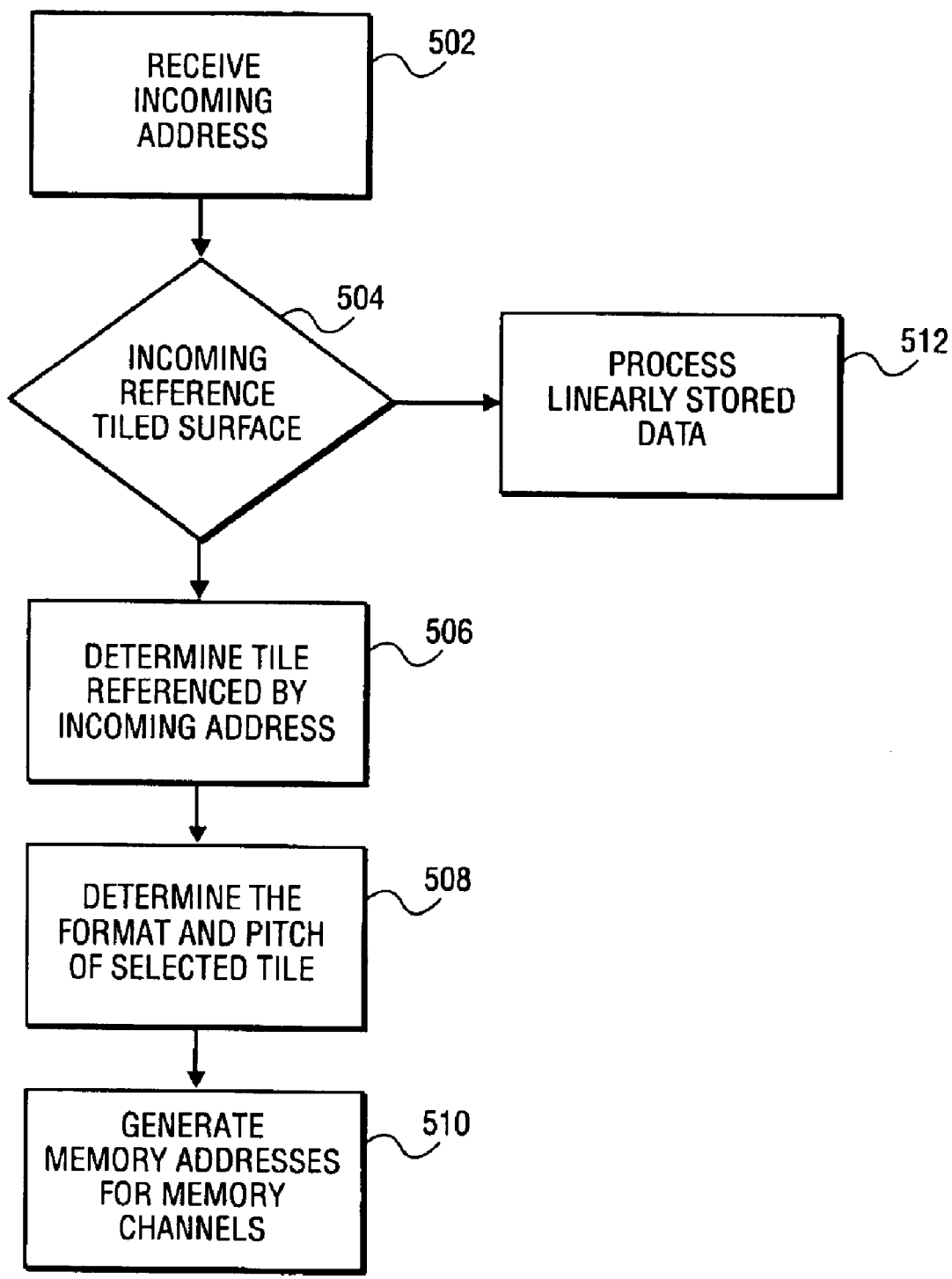
FIG. 5 illustrates detailed flow diagram of an embodiment of a process for mapping a linear address to a tiled address.

In particular, FIG. 5 illustrates detailed flow diagram of an embodiment 500 of a process for mapping an incoming request address to a tiled address. An incoming request address is received from a source (step 502). The incoming address may be in the form of X and Y coordinates representing absolute coordinates of a pixel as located within an image. Coordinate X may represent the location of a pixel in the X direction (i.e., position within a line) from the left hand side of the screen. Coordinate Y may represent the location of a pixel in the Y direction (i.e., scan line number) from the top of the screen.

A determination is then made as to whether the incoming address is referencing a tiled or linear surface (step 504). In a linear format, data is typically stored sequentially in a localized portion of the memory and accessed in a similar sequential manner. Selected video and graphics information is often stored in a tiled format that allows small, localized portions of a video or graphics image to be accessed more rapidly. In an integrated video graphics system, both of these formats are supported by circuitry that controls memory accesses. In a typical implementation, a table lookup can be used to readily determine if the incoming address is directed to a tiled or non-tiled (i.e. linear) memory format. If the incoming address references a linear surface, the data is stored in a linear format where entire rows of data are stored sequentially in memory such that data at the end of one row is stored next to data that begins the following row (step 512).

Figure 8:
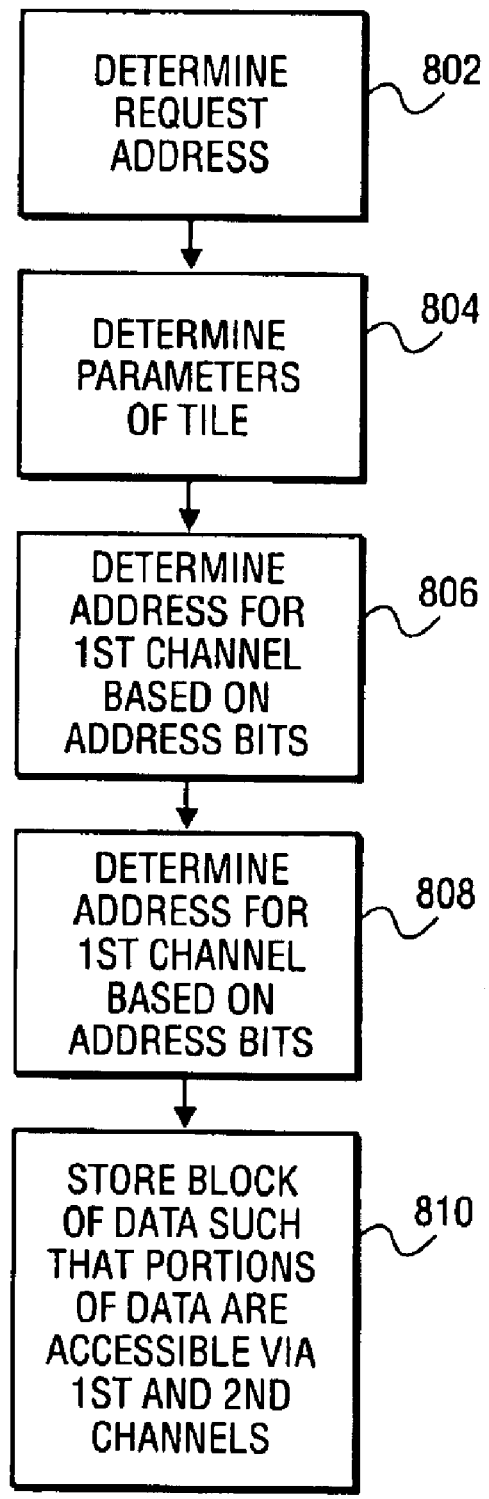
FIG. 8 illustrates a detailed flow diagram of an embodiment of a process for using an incoming request address to generate memory addresses for two memory channels based on tile and request parameters.

If the incoming address is directed at a tiled surface (step 504), the incoming address determines which tile is referenced (step 506) and its parameters, including but not limited to, the address of the tiled surface, tile format (X or Y major) and pitch of the tiled surface (step 508). For example, based on the incoming address, a look up table can be used to provide parameters for each of the tiled surfaces in memory 104. For the selected tile, the incoming request address is used to generate the memory addresses for the two memory channels based on the linear address and tile and request parameters as shown in FIG. 8 and discussed in detail below (step 510).

In particular, the graphics memory is subdivided into a plurality of fenced regions. Surfaces are stored within "fenced" tiled regions within logical graphics memory. Surfaces contained within a fenced region are considered tiled. Each fence is a size-aligned graphics memory region typically ranging in size from 512 KB to 64 MB. The region is generally rectangular shaped, with a pitch in power-of-two widths from 1 tile width (128 B) to 64 tile widths (64*128 B=8 KB). Associated with each fenced region is a tile walk field that specifies which tile format (i.e., X or Y major) applies to the fenced region.

Parameters such as tile format (X or Y major), tile size, tile height and pitch may be programmable parameters stored in software registers of memory configuration registers. Programmable registers allow changing of the operation of the circuit under software control to allow optimizing of tile mapping for each display configuration. The tile size parameter indicates the overall size of each tile (in bytes) and may be determined by the physical parameters (e.g., memory row size) of the memory. Parameters such as tile height and tile pitch may be determined by software depending upon video mode, resolution, and pixel depth.

Implementation

Figure 6:
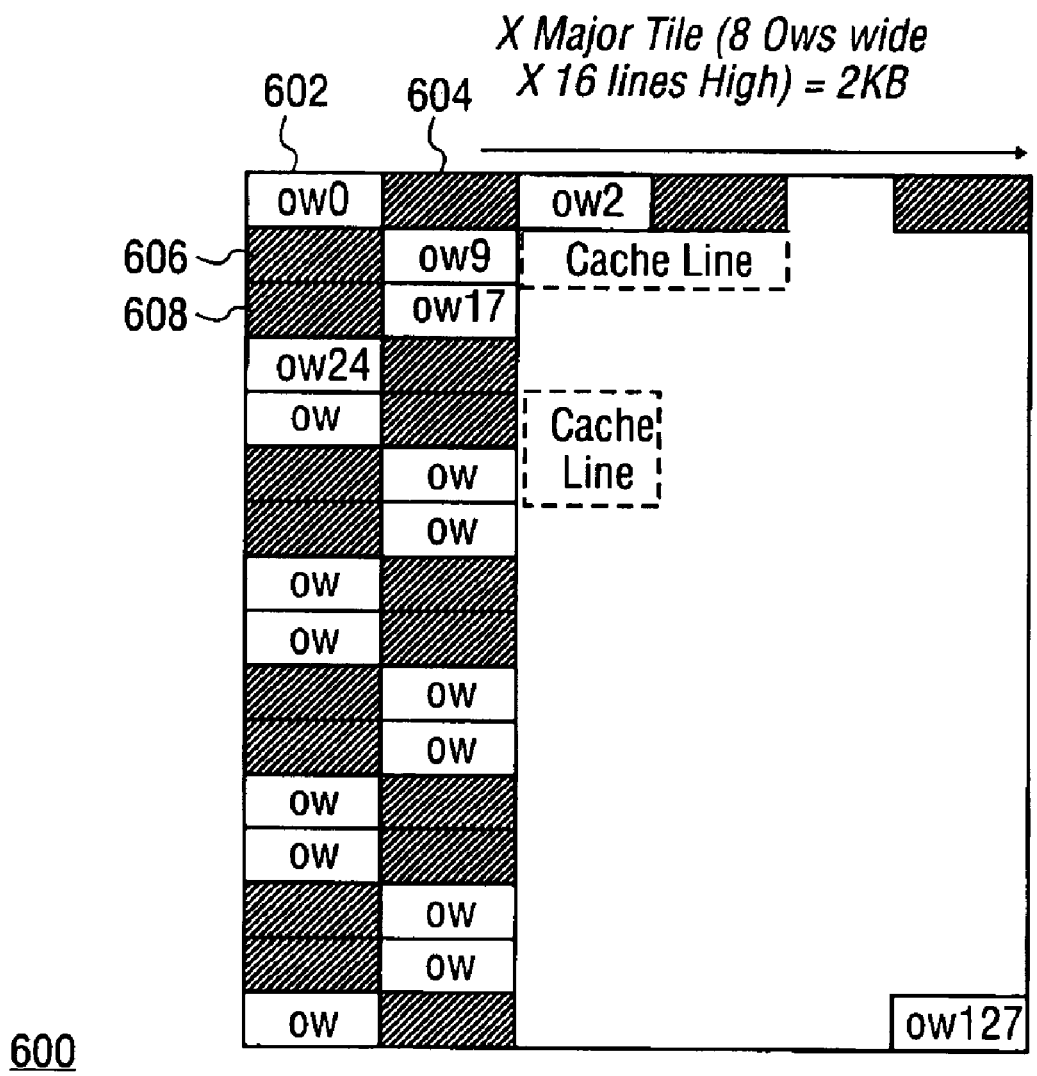
FIG. 6 illustrates a block diagram of an embodiment of Owords mapped in a X-major tile.
Figure 7:
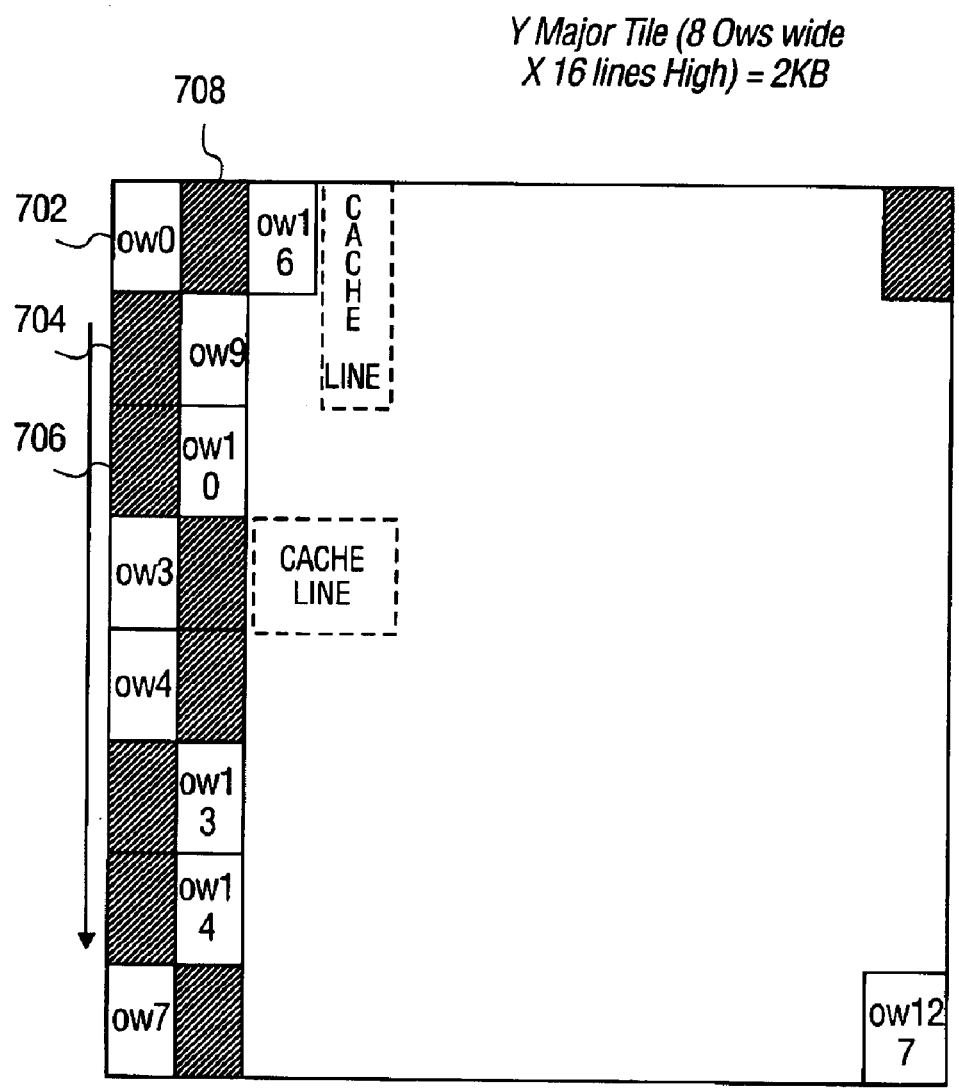
FIG. 7 illustrates a block diagram of an embodiment of Owords mapped in a Y-major tile.

FIGS. 6 and 7 illustrate embodiments of blocks of data, in the form of Owords, mapped in X-major and Y-major tile formats 600 and 700, interleaved among dual memory channels (channels 0 and 1). Memory controller stores the tiled data in the memory in an interleaved format in patterns optimized for graphics and video use. In particular, memory controller stores the set of tiled data in the memory in a format such that successive, or abutting, sets of tiled data are stored in alternating channels of memory, such that data blocks are accessible at the same time, as opposed to sequentially. Thus if the memory controller received a block of data from a source, such as a graphics engine, the memory controller would store portions of the block of data within a single tile in the memory, partitioned such that it is retrievable via alternate channels of memory at the same time.

FIG. 6 illustrates a block diagram of an embodiment 600 of Owords mapped in a X-major tile. In X-major format tile 300, horizontally adjacent elements (e.g., OW0, OW1, OW2 and so forth) are stored in sequential memory addresses. A typical request may access a block of data in the form of 2 Owords on the same scan line at the same time, where each Oword includes 16 bytes of data. Thus if a source, such as a graphics engine, accesses 2 Owords from memory, for example 602 and 604, the memory controller would store the first Oword 602 in a first channel and the second Oword 604 in a second channel such that they can be accessed at the same time, as opposed to sequentially. For example, in a X-major tile format (e.g., 2 KB tile that is 8 Owords wide X 16 lines high) graphics engine typically accesses the following words that are advantageously stored in two different memory channels, such that the Owords can be retrieved at the same time: Oword 0 and Oword 1 (602 and 604); Oword 0 and Oword 8 (602 and 606); Oword 0 and Oword 16 (602 and 608) and so forth.

FIG. 7 illustrates a block diagram of an embodiment of Owords mapped in a Y-major tile. In Y-major tile format tile 400, vertically adjacent elements (e.g., OW1, OW1, OW2 and so forth) are stored in sequential memory addresses. In a Y-major tile format (e.g., 2 KB tile that is 8 Owords wide X 16 lines high) graphics engine typically accesses the following words that are advantageously stored in two different memory channels, such that the Owords can be retrieved at the same time: Oword 0 and Oword 1 (702 and 704); Oword 0 and Oword 2 (702 and 706); Oword 0 and Oword 8 (702 and 708); and so forth.

One skilled in the art will recognize that the word combinations described herein are for illustrative purposes only and the present invention can be utilized to map other accesses and formats as well.

Algorithm

FIG. 8 illustrates a detailed flow diagram of an embodiment 800 of a process for using an incoming request address to generate memory addresses for two memory channels based on tile and request parameters. In a tiling operation, the source data is copied to the destination in a way that interleaves the data such that data can be accessed at the same time, as opposed to sequentially. It should be obvious that the data can be read and written in various other ways to accomplish the desired tiling or interleaving pattern.

Figure 9:
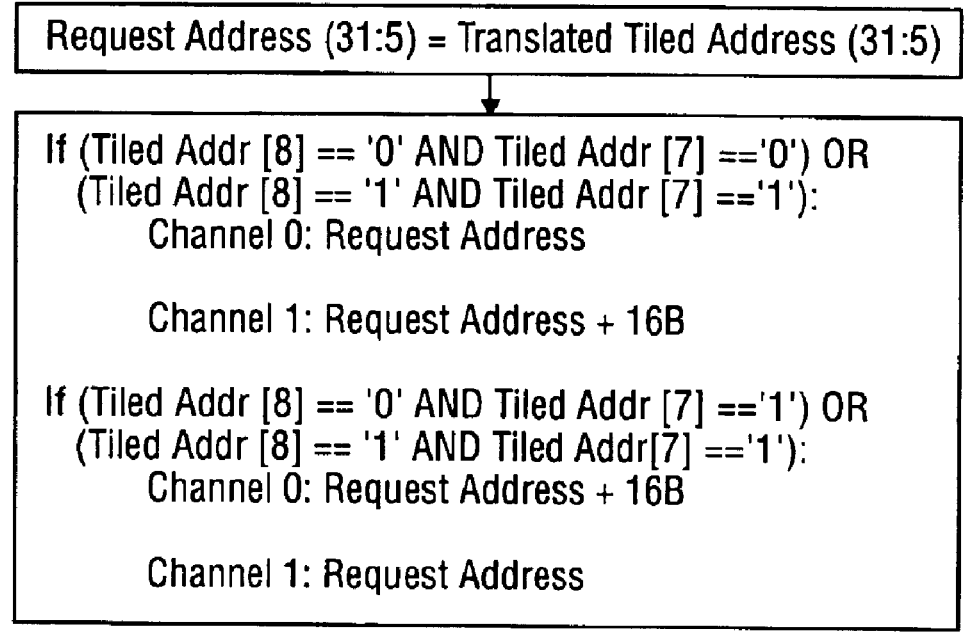
FIG. 9 illustrates a flow diagram of an embodiment of a process for using an incoming request address to generate memory addresses for two memory channels based on tile and request parameters for a X-Major Tile, X Walk Data Request for an aligned Hword (2 Owords on the same scan line).

If the incoming address is directed at a tiled surface (step 802), the incoming address determines which tile is referenced and its parameters, including but not limited to, the address of the tiled surface, tile format (X or Y major) and pitch of the tiled surface (step 804). For example, based on the incoming address, tile parameters and data block configuration, a look up table or other data storage medium or reference can be used to provide parameters for each of the tiled surfaces in memory 104. For the selected tile, the incoming request address is used to generate the memory addresses for the two memory channels based on the linear address and tile and request parameters. For example, the following cases describe typical configurations and the resultant memory addresses for two channels (0 and 1):

CASE 1: X-Major Tile, X Walk Data Request for an Aligned Hword (2 Owords on the Same Scan Line) (See FIG. 9)

Request Address (31:5)=Translated Tiled Address (31:5)
If (Tiled Address [8]="0" AND Tiled Address [7]="0")
OR
(Tiled Address [8]="1" AND Tiled Address [7]="1")
Channel 0=Request Address
Channel 1=Request Address+16 B
If (Tiled Address [8]="0" AND Tiled Address [7]="1")
OR
(Tiled Address [8]="1" AND Tiled Address [7]="0")
Channel 0=Request Address+16 B
Channel 1=Request Address Based on the order in which the initiator needs the data to be returned, the walk bits have to be selected. A request less than an Hword will be a subset with the correct Qwords used for reads and qualified by byte enables for writes.

Figure 10:
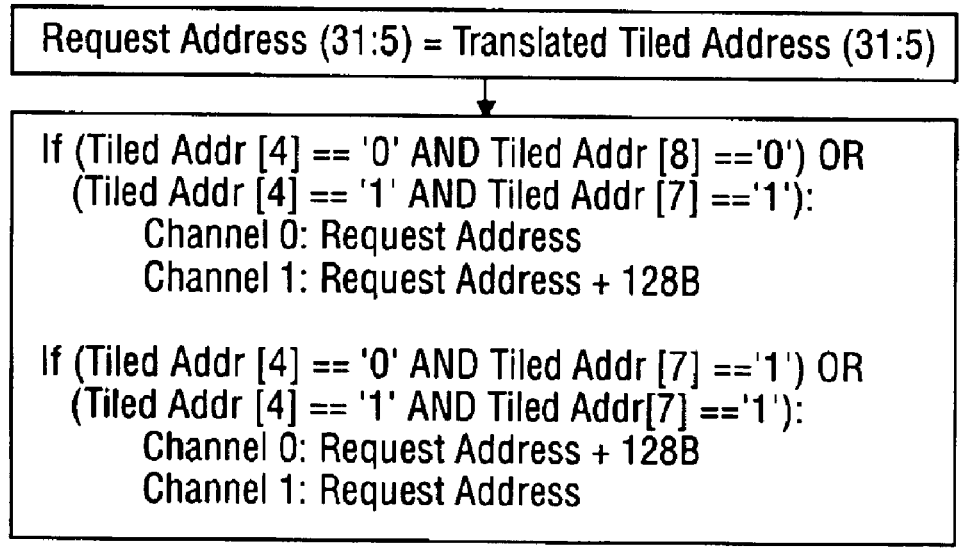
FIG. 10 illustrates a flow diagram of an embodiment of a process for using an incoming request address to generate memory addresses for two memory channels based on tile and request parameters for a X-Major Tile, Y Walk Data Request for 2 adjacent Owords (Double Oword aligned, 2 Owords on adjacent same scan lines).

CASE 2: X-Major Tile, Y Walk Data Request for 2 Adjacent Owords (Double Oword Aligned 2 Owords on Adjacent Same Scan Lines) (See FIG. 10)

Request Address (31:5)=Translated Tiled Address (31:5)
(Tiled Address [4]="0" AND Tiled Address [8]="0") OR
(Tiled Address [4]="1" AND Tiled Address [8]="1")
Channel 0=Request Address
Channel 1=Request Address+128 B
If (Tiled Address [4]="0" AND Tiled Address [8]="1")
OR
(Tiled Address [4]="1" AND Tiled Address [8]="0")
Channel 0=Request Address+128 B
Channel 1=Request Address Based on order in which the initiator needs the data to be returned the walk bits have to be selected.

CASE 3: X-Major Tile, Y Walk Data Request for 2 Owords Skipping One (Even or Odd Owords in an Aligned Quad Oword Region, 2 Owords on Alternate Scan Lines) (See FIG. 11)

Request Address (31:5)=Translated Tiled Address (31:5)
If (Tiled Address [4]="0" AND Tiled Address [7]="0")
OR (Tiled Address [4]="1" AND Tiled Address [7]="1")
Channel 0=Request Address
Channel 1=Request Address+256 B
If (Tiled Address [4]="0" AND Tiled Address [7]="1")
OR
(Tiled Address [4]="1" AND Tiled Address [7]="0")
Channel 0=Request Address+256 B
Channel 1=Request Address
Based on order in which the initiator needs the data to be returned the walk bits have to be selected.

CASE 4: Y-Major Tile, X Walk Data Request for an Aligned Oword on a Scan Line (See FIG. 12)
Request Address (31:5)=Translated Tiled Address (31:5)
If (Tiled Address [5]="0" AND Tiled Address [4]="0")
OR
(Tiled Address [5]="1" AND Tiled Address [4]="1")
Channel 0=Request Address
Qword (Tiled Address [3])=Qword 0 of Source
Qword (Tiled Address [3])=Not Used/Updated
Channel 1=Request Address+128 B
Qword (Tiled Address [3])=Qword 1 of Source
Qword (Tiled Address [3])=Not Used/Updated
If (Tiled Address [5]="0" AND Tiled Address [4]="1")
OR
(Tiled Address [5]="1" AND Tiled Address [4]="0")
Channel 0=Request Address+128 B
Qword (Tiled Address [3])=Qword 1 of Source
Qword (Tiled Address [3])=Not Used/Updated
Channel 1=Request Address
Qword (Tiled Address [3])=Qword 0 of Source
Qword (Tiled Address [3])=Not Used/Updated
Based on order in which the initiator needs the data to be returned, the walk bits have to be selected. A request less than an Oword will be a subset with the correct Qwords used for reads and qualified by byte enables for writes.

Figure 13:
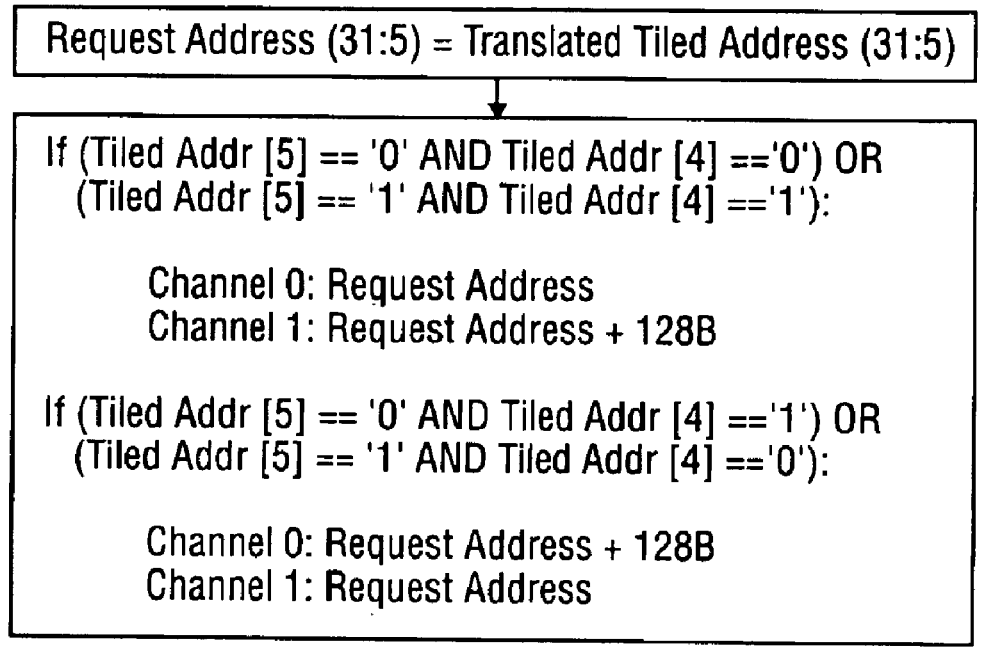
FIG. 13 illustrates a flow diagram of an embodiment of a process for using an incoming request address to generate memory addresses for two memory channels based on tile and request parameters for a Y-Major Tile, X-Y Walk Data Request for 2 Owords (2 Qwords in X by 2 lines in Y).

CASE 5: Y-Major Tile, X-Y Walk Data Request for 2 Owords (2 Qwords in X by 2 Lines in Y) (See FIG. 13)
Request Address (31:5)=Translated Tiled Address (31:5)
If (Tiled Address [5]="0" AND Tiled Address [4]="0")
OR
(Tiled Address [5]="1" AND Tiled Address [4]="1")
Channel 0=Request Address
Channel 1=Request Address+128 B
If (Tiled Address [5]="0" AND Tiled Address [4]="1")
OR
(Tiled Address [5]="1" AND Tiled Address [4]="0")
Channel 0=Request Address+128 B
Channel 1=Request Address
Based on order in which the initiator needs the data to be returned the walk bits have to be selected.

Figure 14:
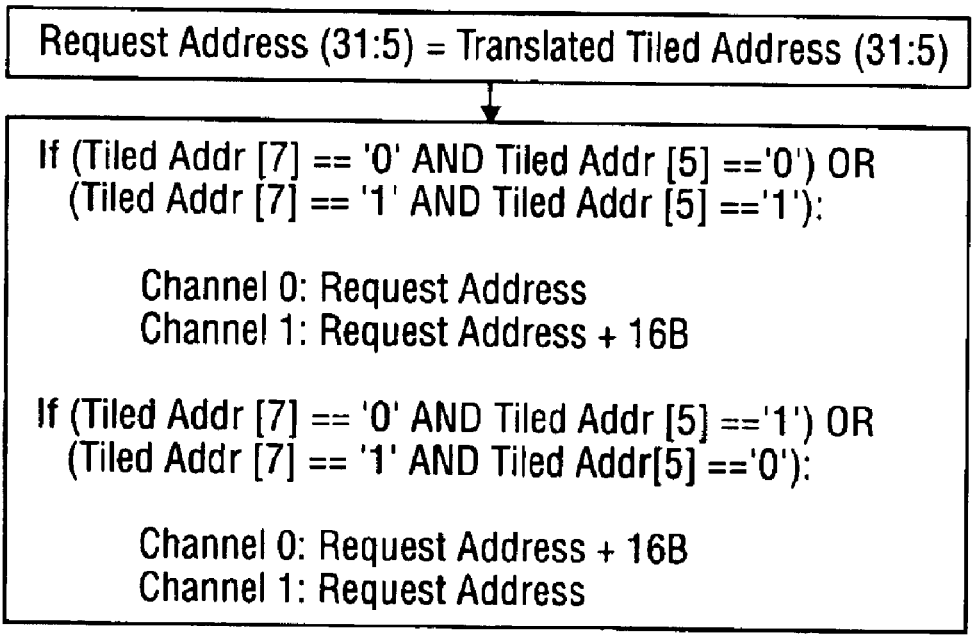
FIG. 14 illustrates a flow diagram of an embodiment of a process for using an incoming request address to generate memory addresses for two memory channels based on tile and request parameters for a Y-Major Tile, Y Walk Data Request for 4 Adjacent Qwords (Hword aligned, 2 Owords on 4 adjacent scan lines).

CASE 6: Y-Major Tile, Y Walk Data Request for 4 Adjacent Qwords (Hword Aligned, 2 Owords on 4 Adjacent Scan Lines) (See FIG. 14)
Request Address (31:5)=Translated Tiled Address (31:5)
If (Tiled Address [7]="0" AND Tiled Address [5]="0")
OR
(Tiled Address [7]="1" AND Tiled Address [5]="1")
Channel 0=Request Address
Channel 1=Request Address+16 B
If (Tiled Address [7]="0" AND Tiled Address [5]="1")
OR
(Tiled Address [7]="1" AND Tiled Address [5]="0")
Channel 0=Request Address+16 B
Channel 1=Request Address
Based on order in which the initiator needs the data to be returned the walk bits have to be selected.

The first and second channel addresses (steps 806 and 808) are determined such that the resulting data is interleaved in a manner that allows portions of the data block to be retrieved simultaneously as well as placing data located proximally in terms of screen display in a similar proximal relationship in memory (step 810).

In a typical implementation, a section of the block image data will map to either channel 1 or 2. For example, case 1 detailed below is directed to a X-major tile, X walk data request for an aligned Hword (2 Owords on the same scan line). The request address for block includes address bits 31:5. If both tiled address bit [8] and tiled address bit [7]=0, or both tiled address bit [8] and tiled address bit [7]=1, the address of channel 0 is equal to the request address and the address of channel 1 is equal to the request address+16 B. Conversely, if tiled address bit [8]=0 and tiled address bit [7]=1, or tiled address bit [8]=1 and tiled address bit [7]=0, the address of channel 0 is equal to the request address=16 B and the address of channel 1 is equal to the request address.

In particular, once channel 0 and 1 addresses are determined via the algorithm, specific address bits C0(25:8), C0(7,6,5,4), C1(25:8) and C1(7,6,5,4) can be determined in accordance with Table 1 below:

TABLE 1

| Case | Channel 0 Address C(0) | Channel 1 Address C(0) | C0(25:8) | C0(7,6 5,4) | C1(25:8) | C1(7,6,5,4) |
|---|---|---|---|---|---|---|
| 1 | Request Address (RA) | Request Address +16B | RA(26:9) | RA(8,7,6,5) | RA(26:9) | RA(8,7,6,"1") |
| 2 | Request Address | Request Address +128B | RA(26:9) | RA(8,7,6,5) | RA(26:9) | RA(8,"1",6,5) |
| 3 | Request Address | Request Address +256B | RA(26:9) | RA(8,7,6,5) | RA(26:9) | RA("1",7,6,5) |
| 4 | Request Address +16B | Request Address | RA(26:9) | RA(8,7,6,"1") | RA(26:9) | RA(8,7,6,5) |
| 5 | Request Address +128B | Request Address | RA(26:9) | RA(8,"1",6,5) | RA(26:9) | RA(8,7,6,5) |
| 6 | Request Address +256B | Request Address | RA(26:9) | RA("1",7,6,5) | RA(26:9) | RA(8,7,6,5) |

For example, referring to TABLE 1, the address for channel 0 is the request address. The address for channel 1 is the request address+16 bytes. The channel 0 address for bits 25-8 is request address bits 26-9. The channel 0 address for bits 7, 6, 5 and 4 is request address bits 8, 7, 6 and 5. The channel 1 address for bits 25-8 is request address bits 26-9. The channel 1 address for bits 7, 6, 5 and 4 is request address bits 8, 7, 6 and 1.

Having portions of the data block stored in different channels in memory minimizes access time since both portions of the data block can be accessed at the same time, as opposed to sequentially. Moreover, data stored proximally in memory is more likely to be resident in a cache simultaneously. Because cache access time is shorter than the access time for a frame buffer and many other memory elements where data is stored, these operations using the cache can retrieve data faster and therefore complete their tasks more efficiently and in less time.

Data at each address in the block of image data must be copied to a corresponding address in the tiled block of image data. The address at which the data is stored in the block of image data is known as the request address for the copy operation. Blocks of image data are typically arranged in arrays arranged in a rectangular format. The destination address, or the corresponding address in the tiled block of image data, is the address to which the data is copied.

The algorithm may be used in a system that transforms image data stored in a first format to image data stored in a tiled format in two separate channels. The transformation to the interleaved dual channel tiled format allows for more efficient use of a cache associated with the graphics processor. Benefits of such a modification are apparent in systems that reuse the image data frequently, one example of which is a graphics processing system that reuses texture data.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for storing a block of tiled data on first and second memory channels in an interleaved pattern comprising:

receiving a set of parameters that describe the block of data from a source;

determining a request address based on the parameters;

translating the request address to corresponding first and second tiled address channels based upon the parameters, further comprising:

determining, based upon selected tiled address bits, a corresponding tiled address for the first channel;

adding an offset to the first tiled address channel to produce a tiled address for the second channel; and storing portions of the block of data in accordance with the first and second tiled addresses such that selected portions of the block of data are accessible at the same time via first and second memory channels.

2. The method of claim 1, wherein the request address is directed to a X-major format tile and X-walk data request.

3. The method of claim 2, wherein the block of data is comprised of an aligned Hword.

4. The method of claim 3, wherein the first tiled address channel equals the request address and the second tiled address channel equals the request address+16B responsive to:

(Tiled Address [8]="0" AND Tiled Address [7]="0") or (Tiled Address [8]="1" AND Tiled Address [7]="1").

5. The method of claim 3, wherein the first tiled address channel equals the request address+168 and the second tiled address channel equals the request address responsive to:

(Tiled Address [8]="0" AND Tiled Address [7]="1") or (Tiled Address [8]="1" AND Tiled Address [7]="0").

6. The method of claim 1, wherein the request address is directed to a X-major format tile and Y-walk data request.

7. The method of claim 6, wherein the block of data is comprised of two adjacent Owords.

8. The method of claim 7, wherein the first tiled address channel equals the request address and the second tiled address channel equals the request address+128 B responsive to:

(Tiled Address [4]="0" AND Tiled Address [8]="0") or (Tiled Address [4]="1" AND Tiled Address [8]="1").

9. The method of claim 7, wherein the first tiled address channel equals the request address+128K and the second tiled address channel equals the request address responsive to:

(Tiled Address [4]="0" AND Tiled Address [8]="1") or (Tiled Address [4]="1" AND Tiled Address [8]="0").

10. The method of claim 1, wherein the request address is directed to a X-major format tile and Y-walk data request.

11. The method of claim 10, wherein the block of data is comprised of two Owords skipping one.

12. The method of claim 11, wherein the first tiled address channel equals the request address and the second tiled address channel equals the request address+256 B responsive to:

(Tiled Address [4]="0" AND Tiled Address [7]="0") or (Tiled Address [4]="1" AND Tiled Address [7]="1").

13. The method of claim 11, wherein the first tiled address channel equals the request address+256 K and the second tiled address channel equals the request address responsive to:

(Tiled Address [4]="0" AND Tiled Address [7]="1") or (Tiled Address [4]="1" AND Tiled Address [7]="0").

14. The method of claim 1, wherein the request address is directed to a Y-major format tile and x-walk data request.

15. The method of claim 14, wherein the block of data is comprised of an aligned Oword on a scan line.

16. The method of claim 15, wherein responsive to (Tiled Address [5]="0" AND Tiled Address [4]="0") or (Tiled Address [5]="1" AND Tiled Address [4]="1")
      Channel 0=Request Address Qword (Tiled Address [3])=Qword 0 of Source Qword (Tiled Address [3])=Not Used/Updated Channel 1=Request Address+128 B Qword (Tiled Address [3])=Qword 1 of Source Qword (Tiled Address [3])=Not Used/Updated.

17. The method of claim 15, wherein responsive to (Tiled Address [5]="0" AND Tiled Address [4]="1") or (Tiled Address [5]="1" AND Tiled Address [4]="0")
      Channel 0=Request Address+128 B Qword (Tiled Address [3])=Qword 1 of Source Qword (Tiled Address [3])=Not Used/Updated Channel 1=Request Address Qword (Tiled Address [3])=Qword 0 of Source Qword (Tiled Address [3])=Not Used/Updated.

18. The method of claim 1, wherein the request address is directed to a Y-major format tile and X-Y walk data request.

19. The method of claim 18, wherein the block of data is comprised of two Owords.

20. The method of claim 19, wherein the first tiled address channel equals the request address and the second tiled address channel equals the request address+128 B responsive to:

(Tiled Address [5]="0" AND Tiled Address [4]="0") or (Tiled Address [5]="1" AND Tiled Address [4]="1").

21. The method of claim 19, wherein the first tiled address channel equals the request address+128 B and the second tiled address channel equals the request address responsive to:

(Tiled Address [5]="0" AND Tiled Address [4]="1") or (Tiled Address [5]="1" AND Tiled Address [4]="0").

22. The method of claim 1, wherein the request address is directed to a Y-major format tile and Y walk data request.

23. The method of claim 22, wherein the block of data is comprised of a four adjacent Qwords.

24. The method of claim 23, wherein the first tiled address channel equals the request address and the second tiled address channel equals the request address+16 B responsive to:

(Tiled Address [7]="0" AND Tiled Address [5]="0") or (Tiled Address [7]="1" AND Tiled Address [5]="1").

25. The method of claim 23, wherein the first tiled address channel equals the request address+16 B and the second tiled address channel equals the request address responsive to:

(Tiled Address [7]="0" AND Tiled Address [5]="1") or (Tiled Address [7]="1" AND Tiled Address [5]="0").

26. The method of claim 1, further comprising:

determining first and second channel address bits based upon the tiled addresses for the first and second channel.

27. The method of claim 1, wherein the source includes a processor, wherein the processor stores and retrieves tiled data that includes a tiled representation of a video image.

28. The method of claim 27, wherein the processor further comprises an MPEG decoder, wherein the MPEG decoder stores and retrieves MPEG video data.

29. The method of claim 1, wherein the source includes a processor that generates graphics images that the processor stores and retrieves image data using the memory controller.

30. A machine readable medium having stored therein a plurality of machine readable instructions executable by a processor to store a block of tiled data on first and second memory channels in an interleaved pattern comprising:

instructions to receive a set of parameters that describe the block of data from a source;

instructions to determine a request address based on the parameters;

instructions to translate the request address to corresponding first and second tiled address channels based upon the parameters, further comprising:

instructions to determine, based upon selected tiled address bits, a corresponding tiled address for the first channel;

instructions to add an offset to the first tiled address channel to produce a tiled address for the second channel; and instructions to store portions of the block of data in accordance with the first and second tiled addresses such that selected portions of the block of data are accessible at the same time via first and second memory channels.

31. The machine readable medium of claim 30, wherein the request address is directed to a X-major format tile.

32. The machine readable medium of claim 30, wherein the request address is directed to a Y-major format tile.

33. An apparatus for tiling a block of image data in an interleaved pattern among a first and second channel, comprising:

a controller to determine, based upon selected tiled address bits, a corresponding tiled address for a first channel, add an offset to the first tiled address channel to produce a tiled address for a second channel, and store portions of the block of data in the memory in accordance with the first and second tiled addresses such that selected portions of the block of data are accessible at the same time via first and second memory channels.

34. An apparatus for tiling a block of image data in an interleaved pattern among a first and second channel, comprising:

a memory;

a controller to:

determine, based upon selected tiled address bits, a corresponding tiled address for a first channel;

add an offset to the first tiled address channel to produce a tiled address for a second channel; and store portions of the block of data in the memory in accordance with the first and second tiled addresses such that selected portions of the block of data are accessible at the same time via first and second memory channels.

* * * * *

UNITED STATES PATENT AND TRADEMARK OFFICE
CERTIFICATE OF CORRECTION

PATENT NO. : 6,999,091 B2  Page 1 of 1
APPLICATION NO. : 10/033439
DATED : February 14, 2006
INVENTOR(S) : Saxena et al.

It is certified that error appears in the above-identified patent and that said Letters Patent is hereby corrected as shown below:

In column 12, at line 4, delete "168" and insert --16B--.

Signed and Sealed this

Twenty-seventh Day of May, 2008

JON W. DUDAS
*Director of the United States Patent and Trademark Office*